United States Patent [19]

Fan

[11] 4,374,875

[45] Feb. 22, 1983

[54] WATER-BORNE THERMOPLASTIC POLYHYDROXYETHER COMPOSITIONS

[75] Inventor: You-Ling Fan, East Brunswick, N.J.

[73] Assignee: Union Carbide Corporation, Danbury, Conn.

[21] Appl. No.: 333,893

[22] Filed: Dec. 23, 1981

Related U.S. Application Data

[62] Division of Ser. No. 216,639, Dec. 15, 1980, Pat. No. 4,355,122.

[51] Int. Cl.$^3$ .............................................. B05D 3/02
[52] U.S. Cl. ................................. 427/386; 427/388.4; 523/423; 525/119; 525/391; 525/529; 525/531
[58] Field of Search ............... 525/119, 391, 529, 531; 427/388.4, 386; 523/423

[56] References Cited

U.S. PATENT DOCUMENTS

| | | | |
|---|---|---|---|
| 3,306,872 | 2/1967 | Maycock et al. | 260/32.8 |
| 4,182,699 | 1/1980 | Fan | 260/29.6 |
| 4,202,808 | 5/1980 | Fan | 260/29.6 |
| 4,212,781 | 7/1980 | Evans et al. | 260/29.4 |

*Primary Examiner*—Michael R. Lusignan
*Attorney, Agent, or Firm*—Bernard Francis Crowe

[57] ABSTRACT

Water-borne thermoplastic polyhydroxyether resins are prepared by grafting carboxyl-containing vinyl monomers onto phenoxy resins with a free radical initiator and then converting the graft copolymer to an ionomer suitable for use as protective coatings for metals.

4 Claims, No Drawings

WATER-BORNE THERMOPLASTIC POLYHYDROXYETHER COMPOSITIONS

This is a division of Ser. No. 216,639 filed Dec. 15, 1980, now U.S. Pat. No. 4,355,122; patented Oct. 19, 1982.

BACKGROUND OF THE INVENTION

This invention pertains to thermoplastic polyhydroxyether resins and more particularly to their conversion to water-borne resins.

Thermoplastic polyhydroxyether resins are a family of amorphous, high molecular weight phenoxy resins derived from diphenols and epichlorohydrin. They are noted for their excellent flexibility, impact and abrasion resistance and adhesive strength. Because of these outstanding properties, they are used commercially for a variety of coating and adhesive uses. In coating applications thermoplastic polyhydroxyethers also offer good salt-spray and overtake resistance.

Thermoplastic polyhydroxyethers are insoluble in water and are usually applied as a solution in organic solvents, such as, ketones or esters or mixture of such solvents. Because of their high molecular weight (at least about 20,000 weight average) and chain rigidity, a large amount of organic solvent must be employed to achieve a satisfactory solution properties during application. To prevent pollution of the atmosphere, environmental standards require that such organic solvents or vehicles must be either recovered or burned at considerable cost to the end user.

It is therefore an object of this invention to provide a means for employing thermoplastic polyhydroxyether resins without the use of large amounts of organic solvents.

It is another object of this invention to provide thermoplastic polyhydroxyethers which can be dispersed in water as water-borne compositions.

It is a further object of this invention to provide a system whereby thermoplastic polyhdroxyether resins can be applied and utilized from a water-borne system without significantly changing the desirable properties of the phenoxy resin.

SUMMARY OF THE INVENTION

It has now been found that one may prepare a thermoplastic polyhydroxyether dispersed in water by:

(1) grafting onto normally solid thermoplastic polyhydroxyether one or more ethylenically unsaturated hydrocarbon monomers having 3 to about 8 carbons at least one of said monomers containing sufficient carboxyl, -COOH, groups to provide from about 1 carboxyl group per 10 monomeric units of thermoplastic polyhydroxyether to about 10 carboxy groups per each monomeric unit of polyhydroxyether; and (2) blending said grafted thermoplastic polyhydroxyether in a high turbulence field with:
(a) water,
(b) a water-miscible base, and
(c) a water-miscible organic solvent in which said thermoplastic polyhydroxyether is soluble until an ionomer of the grafted thermoplastic polyhydroxyether is obtained as a colloidal dispersion.

Preferably the grafting operation provides from about 1 carboxyl group per 4 monomeric units of polyhydroxyether to about 4 carboxyl groups per each monomeric unit of polyhydroxyether.

This colloidal dispersion can be used to apply coatings of thermoplastic polyhydroxyethers to various substrates both metallic and non-metallic, by contacting the substrates with the dispersions and then allowing them to dry.

The grafting operation can be carried out by conventional techniques, such as, suspension polymerization wherein powdered thermoplastic polyhydroxyether, carboxyl containing hydrocarbon monomer and free radical initiator are suspended in a liquid medium and polymerized; polymerization of the above ingredients in a malt extruder and solution polymerization of the above ingredients as a varnish in an organic solvent. Solution polymerization is the preferred method of preparing the grafted thermoplastic polyhydroxyethers.

An alternative method where finer particle size colloidal dispersions are desired consists in blending the colloidal dispersions of the grafted thermoplastic polyhydroxyethers in a high turbulence field with at least one water-miscible organic solvent having an affinity for said grafted thermoplastic polyhydroxy ether and a water-miscible diluent poor-solvent and then removing solvent and diluent until the resultant colloidal dispersion contains from about 0.1 to about 25 weight % organic volatiles. Contacting substrates with this colloidal dispersion and drying affords a smooth coating thereon.

The term "thermoplastic polyhydroxyether" herein refers to substantially linear polymers having the general formula:

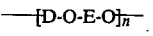

wherein D is the radical residuum of a dihydric phenol, E is an hydroxyl containing radical residuum of an epoxide and n represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic poly(hydroxyethers) thus produced have reduced viscosities of at least 0.43. Reduced viscosity values were computed by use of the equation:

$$\text{Reduced Viscosity} = (t_s - t_o)/ct_o$$

wherein $t_o$ is the efflux time of the solvent (tetrahydrofuran, $t_s$ is the efflux time of the poly(hydroxyether) solution, c is the concentration of the poly(hydroxyether) solution in terms of grams of poly(hydroxyether) per 100 ml. of tetrahydrofuran.

The dihydric phenol contributing the phenol radical residuum, D, can be either a dihydric mononuclear phenol such as those having the general formula:

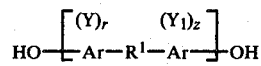

wherein AR is an aromaic divalent hydrocarbon such as naphthylene and, preferably, phenylene, Y and $Y_1$ which can be the same or different are alkyl radicals, preferably having from 1 to 4 carbon atoms, halogen atoms, i.e., fluorine, chlorine, bromine annd iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond betwen adjacent carbon atoms as in dihydroxydiphenyl or is a divalent radical including, for example

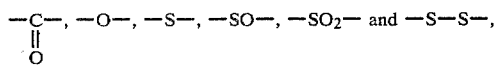

and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated alkyl, alkoxy or aryloxy substituted aromtic radicals and a ring fused to an Ar group: or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl) alkanes such as 2,2-bis(4-hydroxyphenol)propane, 2,4'-dihydroxydiphenylmethane, bis(2-hydroxyphenyl)methane, bis(4-hydroxyphenyl)methane, bis(4-hydroxy-2,6-dimethyl-3-methoxyphenyl)methane, 1,1-bis(4-hydroxyphenyl)ethane, 1,2-bis(4-hydroxyphenyl)-ethane, 1,1-bis(4-hydroxy-2-chlorophenyl)ethane, 1,1-bis(3-methyl-4-hydroxyphenyl)ethane, 1,3-bis(3-methyl-4-hydroxyphenyl)propane, 2,2-bis(3-phenyl-4-hydroxyphenyl)propane, 2,2-bis(3-isopropyl-4-hydroxyphenyl)propane, 2,2-bis(2-isopropyl-4-hydroxyphenyl)propane, 2,2-bis(4-hydroxylnaphthyl)propane, 2,2-bis(4-hydroxyphenyl)pentane, 3,3-bis(4-hydroxyphenyl)pentane, 2,2-bis(4-hydroxyphenyl)heptane, bis(4-hydroxyphenyl)phenylmethane, bis(4-hydroxyphenyl)cyclohexylmethane, 1,2-bis(4-hydroxyphenyl-1,2-bis(phenyl)propane, 2,2-bis(4-hydroxyphenyl)-1-phenyl-propane and the like;

Di(hydroxyphenyl)sulfones such as bis(4-hydroxyphenyl) sulfone, 2,4'-dihydroxydiphenyl sulfone, 5'-chloro-2,4'-dihydroxydiphenyl sulfone, 5'chloro-4,4'-dihydroxydiphenyl sulfone and the like;

Di(hydroxyphenyl)ethers such as bis(4-hydroxyphenyl)ether, the 4,3'-, 4,2'-, 2,2'-, 2,3'-, dihydroxydiphenyl ethers, 4,4'-dihydroxy-2,6-dimethyldiphenyl ether, bis(4-hydroxy-3-isobutylphenyl)ether, bis(4-hydroxy-3-isopropylphenyl)ether, bis(4-hydroxy-3-chlorophenyl)ether, bis(4-hydroxy-3-fluorophenyl)ether, bis(4-hydroxy-3-bromophenyl)ether, bis(4-hydroxynaphthyl)ether, bis(4-hydroxy-3-chloronaphthyl)ether, bis(2-hydroxydiphenyl)ether, 4,4'-dihydroxy-2,6-dimethoxydiphenyl ether, 4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bisphenol reaction products of dipentene or its isomers and phenols such as 1,2-bis(p-hydroxyphenyl)-1-methyl-4-isopropylcyclohexane as well as bisphenols such as 1,3,3,-trimethyl-1-(4-hydroxyphenyl) -6-hydroxyindane, and 2,4-bis(4-hydroxyphenyl)-4-methylpentane, and the like.

Particularly desirable dihydric polynuclear phenols have the formula

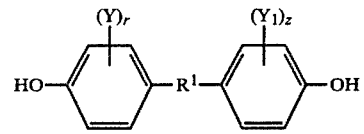

wherein Y and $Y_1$ are as previously defined, r and z have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms, thus,

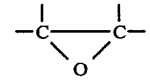

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e. $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

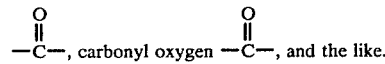

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-caboxylate), bis(3,4-epoxycyclohexyl-methyl) adipate, bis(3,4-epoxycyclohexylmethyl)phthalate, 6-methyl-3,4-epoxycyclohexylmethyl-6-methyl-3,4-epoxycyclohexane carbonylate, 2-chloro-3,4-epoxycyclohexylmethyl-2-chloro-3,4-epoxycyclohexanecarboxylate, diglycidyl ether, bis(2,3-epoxycyclopentyl)ether, 1,5-pentanediol bis(4-methyl-3,4-epoxycyclohexylmethyl)ether, bis(2,3-epoxy-2-ethylhexyl)adipate, diglycidyl maleate, diglycidyl phthalate, 3-oxatetracyclo-[4.4.0.1$^{7,10}$.0$^{2,4}$]-undec-8-yl 2,3-epoxypropyl ether, bis(2,3-epoxycyclopentyl)-sulfone, bis(3,4-epoxyhexoxypropyl)sulfone, 2,2'-sulfonyldiethyl, bis(2,3-epoxycyclopentanecarboxylate), 3-oxatetracyclo[4.4.0.1$^{7,10}$.0$^{2,4}$]-undec-8-yl 2,3-epoxybutyrate, 4-pentanal-di-(6methyl-3,4-epoxycyclohexylmethyl) acetal, ethylene glycol bis(9,10-epoxystarate), diglycidyl carbonate, bis(2,3-epoxybutylpenyl)-2-ethylhexyl phosphate, diepoxydioxane, butadiene diepoxide, and 2,3-dimethyl butadiene diepoxide. The preferred diepoxides are those wherein each of the oxirane groups is connected to an electron donating substituent which is not immediately connected to the carbon atoms of that oxirane group. Such diepoxides having the grouping

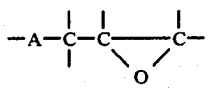

wherein A is an electron donating substituent such as

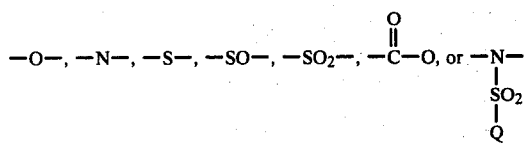

and Q is a saturated hydrocarbon radical such as an alkyl, cycloalkyl, aryl or aralkyl radical.

For the purposes of this invention the term "water-miscible base" is used in the broad sense of any portion acceptor which will neutralize the acid funtionalities in the thermoplastic polyhydroxyether, i.e., —COOH groups and whose solubility is at least about 1 g. per 1000 cc of water. Exemplary bases which may be organic or inorganic, include alkali metal or alkaline earth hydroxides, such as, sodium hydroxide, potassium hydroxide, lithium hydroxide, magnesium hydroxide, calcium hydroxide, strontium hydroxide, barium hydroxide, and the like; and ammonium hydroxide; organic amines including monoalkylamines, alkalolamines, aromatic amines, cyclic amines, alkaryl amines, and the like. For economic reasons and ready availability alkali metal, alkaline earth and ammonium hydroxides are preferred inorganic bases. In coating applications it is preferred to use volatile bases which are fugitive annd consequently reversible ionomers are formed. For example, ammonium hydroxide or lower molecular weight alkylamines form ionomers which afford coatings wherein the ionomer moieties revert to acid and from which the base, being fugitive, is removed. This enhances blush resistance and minimizes color formation upon exposure of the final coating to the elements. Particularly preferred alkyl amines include monomethyl amine, dimethyl amine, trimethyl amine, triethyl amine, and the like.

In general, preferred alkyl amines have the formula:

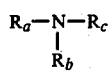

wherein each of $R_a$, $R_b$, and $R_c$ is H or a $C_1$–$C_6$ alkyl with the proviso that $R_a+R_b+R_c \leq 6$ carbons.

Preferred alkanolamines include mono-, di-, and triethanolamine, N-methyl ethanolamine, N,N-dimethylethanolamine, N,N-diethyl ethanolamine, N-aminoethylethanolamine, N-methyl diethanolamine, and the like.

Preferred cyclic amines include morpholine, N-methyl morpholine, piperidine, pyrrolidine, piperazine, N-methyl piperzine, N-(2-hydroxyethyl)piperazine, N-aminoethyl piperazine, 2,5-dimethyl piperazine, hexamethylene tetramine, and the like.

Exemplary ethylenically unsaturated hydrocaron monomers containing carboxyl groups, useful in this invention include: acrylic acid, methacrylic acid, itaconic acid, maleic acid, fumaric acid and the like.

While not critical for the practice of this invention, the grafting of non-carboxyl containing ethylenically unsaturated hydrocarbon monomers serves to modify the physical properties of the grafted thermoplastic polyhydroxyether, such as Tg (second order transition temperature) and the like. Exemplary ethylenically unsaturated hydrocarbon monomers that do not contain carboxyl groups include acrylic or methacrylic alkyl esters, such as, methyl methacrylate, ethyl acrylate, n-propyl methacrylate, butyl acrylate, and the like; cyano-containing monomers, such as, acrylonitrile, methacrylonitrile, and the like; aromatic vinyl monomers, such as, stryrene, α-methyl styrene, p-vinyl toluene and the like.

Suitable water-miscible organic solvents include aliphatic ketones having 3 to about 5 carbons as for example, acetone, methyl ethyl ketone, diethyl ketone, methyl propyl ketone and the like; monoalkyl ether glycols, e.g., monomethyl ether of ethylene glycol, monoethyl ether of ethylene glycol, monoethyl ether of ethylene glycol, monopropyl ether of ethylene glycol, monobutyl ether of ethylene glycol and the like; monoalkyl ether diethylene glycols, e.g., monomethyl ether of diethylene glycol, monoethyl ether of diethylene glycol, monobutyl ether of diethylene glycol, and the like; monoalkyl ethers of triethylene glycol, e.g., ethoxy triglycol, and the like; esters of monoalkyl ethers of ethylene glycol, e.g., monoethyoxy glycol acetate, monobutoxy glycol acetate, and the like; esters of monoalkyl ethers of diethylene glycols, e.g., monopropoxy diethylene glycol acetate, monobutoxy diethylene glycol acetate, and the like; alkoxy alkyl ketones, such as, 4-methoxy-4-methyl pentanone-2, and the like; alkoxy alkyl aliphatic alcohols, such as 4-methoxy-4-methyl pentanol-2, and the like; cyclic ethers, e.g., furan, dioxane, trioxane, and the like; dialkyl aliphatic acid amides, e.g, dimethyl formamide, dimethyl sulfoxide, mesityl oxide; and mixtures of organic solvents having a solubility parameter, δ, within 1 unit of that of the thermoplastic polyhydroxyether. Exemplary mixtures include toluene/butanol, 60/40.

Suitable water-miscible diluents which are poor solvents for grafted thermoplastic polyhyroxyethers include aliphatic alcohols having 1 to about 5 carbons, as for example, methanol, ethanol, propanols, butanols, pentanols, and the like.

Blending in a high turbulence field can be readily accomplished by the use of a Waring Blendoror any high shear mixer known to those skilled in the art.

Removal of organic solvent and diluent from the colloidal dispersion can be effected by means known to those skilled in the art, as for example by stripping, distillation or evaporation at atmospheric or subatmospheric pressures and the like.

The grafting of the ethylenicaly unsaturated hydrocarbon monomers can be accomplished by standard polymerization techniques known in the art. Solution polymerization using a free radical initiator, such as benzoyl peroxide, azobisisobutyronitrile and the like is preferred.

The water-borne thermoplastic polyhydroxyethers of this invention exhibit excellent stability, good wetting and filming behavior.

The invention is further described in the Examples which follow. All parts and percentages are by weight unless otherwise specified.

EXAMPLE 1

Into a 500 ml, three necked, round bottom flask, equipped with a mechanical stirrer, a condenser, a thermometer, and a nitrogen inlet and outlet, there was charged a phenoxy resin varnish containing 60 g. of Bakelite Phenoxy Resin PKHA (Union Carbide Corporation thermoplastic polyhydroxyether having a weight average molecular weight of about 30,000) and 240 g. of methyl ethyl ketone, 9.1 g. of styrene, 10.1 g. methacrylic acid, 0.92 g. of ethyl acrylate, and 1.2 g. of benzoyl peroxide in 20 ml of methyl ethyl ketone. The system was purged with nitrogen for 30 minutes. Thereafter, the reaction mixture was heated to 80° C. with an external heating mantle while under a nitrogen atmosphere and agitation. After refluxing at 80.5° C. for one hour, the reaction mixture became cloudy, which is believed to result from a change in solubility characteristics of the phenoxy resin as a consequence of grafting.

A 20-gram quantity of the above mixture as cooled to room temperature and coagulated in hexane. After washing with additional hexane, the solid polymer was dried under vacuum at 60° C.

A transparent film was cast from a methyl ethyl ketone solution of the above recovered polymer. Infrared spectrum showed the presence of typical carbonyl bands due to the grafting of methacrylic acid and ethyl acrylate. The simultaneous grafting of styrene was confirmed by nuclear magnetic resonance measurement.

EXAMPLE 2

This example illustrates that the acid-grafting phenoxy resin prepared in Example 1 can be converted to a water-borne dispersion by high speed mixing and in the presence of a water-miscible base and water.

Two hundred and fifty grams of the varnish prepared in Example 1 was preheated to 44° C. and, subsequently, mixed in a high-speed Waring blendor with an aqueous solution containing 10 g of dimethylethanolamine and 250 g. of water. A milky, water-borne latex was obtained. The latex had a pH of 7.5 and contained fairly coarse particles ranging from 5 to 50 microns in diameter.

EXAMPLE 3

The example demonstrates that an extremely fine dispersion of the acid-modified phenoxy resin can be prepared if the interfacial tension of the system is further reduced by the addition of a suitable water-miscible organic diluent such as an aliphatic alcohol.

Into a Waring blendor containing 475.7 g. of the coarse emulsion prepared in Example 2, there was added while under vigorous stirring, 57.1 g. of n-butanol. The finished emulsion exhibits an intense Tyndall scattering effect characteristic of extremely fine dispersion. It possessed a pH of 8.6 and a Brookfield viscosity of 454 cps.

EXAMPLE 4

Four hundred grams of the dispersion prepared in Example 3 was concentrated under vacuum at 50° C. using a rotatory evaporator. A total of 287.6 g. of condensates was collected, and the resin content of the dispersion was raised from the original 8.72 percent to 20 percent. The concentrated dispersion remained to be highly uniform. It exhibited a pH of 8.5 and a Brookfield viscosity of 3200 cps. Gas chromatographic analysis showed that the liquid phase contained 21 percent and 79 percent by weight of organics and water, respectively.

EXAMPLE 5

Into a 500 ml three-necked, round-bottom flask, equipped with a mechanical stirrer, a condenser, a thermometer, and a nitrogen inlet and outlet, there was charged a phenoxy resin varnish containing 58.4 g. of Bakelite Phenoxy Resin PKHA and 233.6 g. of ethyl Cellosolve (a glycol ether solvent produced by Union Carbide Corporation), 9.2 g. of methyl methacrylate, 10.1 g. of methacrylic acid, 0.92 g. of ethyl acrylate, and 1.2 g. of benzoyl peroxide dissolved in 20 ml of ethyl cellosolve. The system was purged with nitrogen for 30 minutes. Thereafter, the reaction mixture was heated to 119° C. and refluxed for a period of two hours. The initially slightly opaque solution was transformed to a colorless and translucent solution. The finished varnish exhibited a Brookfield viscosity of 376 at 255° C.

EXAMPLE 6

A mixture containing 250 g. of the acid-modified phenoxy resin varnish made in Example 5 and 63.2 g. of n-butanol was mixed in a Waring blendor until the temperature reached 40° C. Thereafter an aqueous solution composed of 10 g. of dimethylethanolamine and 250 g. of water was added in under vigorous mixing until the mixture's temperature reached 50° C. A uniform, fine dispersion exhibiting a fairly strong Tyndall scattering effect was obtained. The dispersion exhibited a Brookfield viscosity of 28 cps and a pH of 8.9 at 26.2° C.

EXAMPLE 7

Four hundred g. of the water-borne phenoxy resin dispersion prepared in Example 6 was concentrated under vacuum to a final weight of 171.3 grams. The concentrated emulsion had a resin content of 18 percent by weight and a Brookfield viscosity of 200 cps. Gas chromatographic analysis showed that the liquid phase contained 21 percent total organics and 79 percent water.

EXAMPLE 8

Example 1 was repeated with a somewhat different formulation shown as follows:

| | |
|---|---|
| PKHA Phenoxy Resin | 60 g. |
| MEK (methyl ethyl ketone) | 340 g. |
| Acrylic Acid | 6 g. |
| Styrene | 4 g. |
| Acrylonitrile | 4 g. |
| Azobisisobutyronitrile Solution 1.2 gm in 20 ml MEK | |

The polymerization was carried out at 80.5° C. for a period of one hour. A slightly hazy solution was obtained.

EXAMPLE 9

Two hundred and fifty g. quantity of the above acid-modified phenoxy resin varnish was mixed with 63 g. of n-butyl alcohol in a Waring Blendor. Thereafter, an aqueous solution containing 250 g. of water and 5 g. of ammonium hydroxide was added to the varnish while under vigorous agitation. A uniform, fine dispersion was obtained, while showed a pH of 9.8 and a Brookfield viscosity of 29 cps at 25° C.

EXAMPLE 10

The dispersion prepared in Example 9 was stripped under vacuum at 55° C. Sufficient amount of volatiles was removed until the resin concentration was raised from the initial 7.53 percent to 18 percent by weight. A more viscous but highly uniform dispersion was obtained, which possessed a pH of 7.8 and a Brookfield viscosity of 242 cps at 26° C. Gas chromatographic analysis showed the volatile phase contained 80 percent and 20 percent by weight of water and organics, respectively.

EXAMPLE 11

The water-borne phenoxy resin dispersions exhibit excellent film-forming protective properties on a variety of metallic substrates shown in the following table.

| Substrate | Baking Condition | Result |
|---|---|---|
| Cold-rolled steel Bonderite 40 | 160° C. 5 min. | Clear, continuous, glossy, tough film was obtained with excellent adhesion to the substrate |
| Aluminum-3003-H14 Bonderite-721 | 160° C. 5 min. | Clear, continuous, glossy, tough film was obtained with excellent adhesion to the substrate |
| Aluminum-Q-Panel | 160° C. 5 min. | Clear, continuous, glossy, tough film was obtained with excellent adhesion to the substrate |
| Tin Plate, electro- lytic | 160° C. 5 min. | Clear, continuous, glossy, tough film was obtained with excellent adhesion to the substrate |

The above coatings were prepared using the dispersion prepared in Example 4. A suitable drawdown rod was employed to produce a dry-film thickness of 0.2 mil.

EXAMPLE 12

A thermosetting, water-borne phenoxy resin formulation was prepared by thoroughly mixing 50 g. of the phenoxy dispersion made in Example 7 with 0.5 g. of Cymel-303 Melamine resin (Trademark of American Cyanamid for hexamethoxymethylmelamine). A drawdown coating was applied on a cold-rolled steel panel (Bonderite-40) and was baked at 165° C., for a period of five minutes. A clear glossy coating was obtained which was no longer soluble in MEK.

Although the invention has been described in its preferred forms with a certain degree of particularity, it will be understood by those skilled in the art that the present disclosure has been made only by way of example and that numerous changes can be made without departing from the spirit and the scope of the invention.

I claim:

1. Method of protecting metallic substrates which comprises depositing a colloidal dispersion of a thermoplastic polyhydroxyether on said substrates followed by baking at elevated temperatures until a clear, continuous, tough film adheres to said substrates, said colloidal dispersion being prepared by:
   (1) grafting onto normally solid thermoplastic polyhydroxyether one or more ethylenically unsaturated hydrocarbon monomers having 3 to about 8 carbons at least one of said monomers containing sufficient carboxyl, —COOH, groups to provide from about 1 carboxyl group per 10 monomeric units of thermoplastic polyhydroxyether to about 10 carboxy groups per each monomeric unit of polyhydroxyether; and
   (2) blending said grafted thermoplastic polyhydroxyether in a high turbulence field with:
      (a) water,
      (b) a water-miscible base, and
      (c) a water-miscible organic solvent in which said thermoplastic polyhydroxyether is soluble until an ionomer of the grafted thermoplastic polyhydroxyether is obtained as colloidal dispersion, said thermoplastic polyhydroxyether having the general formula:

$$\text{—D-O-E-O—}_n$$

wherein D is the radical residuum of a dihydric phenol, E is an hydroxyl containing radical residuum of an epoxide and n represents the degree of polymerization and is at least 30.

2. Method claimed in claim 1 wherein the colloidal dispersion of an ionomer of the grafted thermoplastic polyhydroxyether is blended in a high turbulence field with at least one water-miscible organic solvent having an affinity for said grafted thermoplastic polyhydroxyether and a water-miscible diluent poor solvent and then stripping off solvent and diluent until the resultant colloidal dispersion contains from about 0.1 to about 25 weight % organic volatiles.

3. Method claimed in claim 1 wherein a thermosetting amount of a hexamethoxymethylmelamine is blended with the grafted thermoplastic polyhydroxyether colloidal dispersion followed by heating at an elevated temperature.

4. Method of protecting metallic substrates which comprises depositing the colloidal dispersion described in claim 1 containing a thermosetting amount of hexamethoxymethylmelamine on said substrates followed by heating at an elevated temperature until a clear, tough, continuous film adheres to said substrates.

* * * * *